Feb. 18, 1958  C. R. GOFF  2,824,215
HEADLIGHT ADJUSTMENT
Filed July 24, 1956
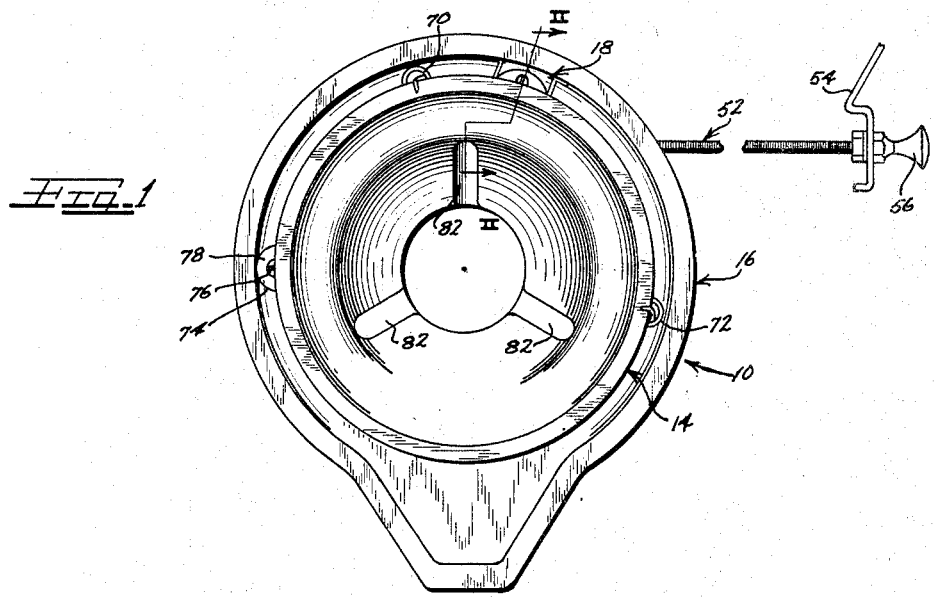
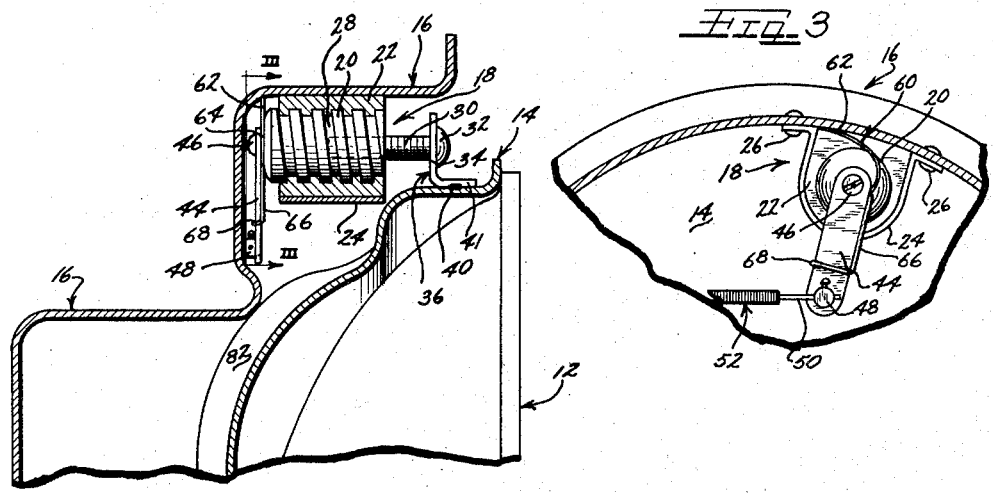
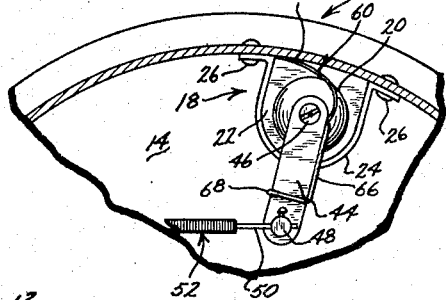
Inventor
CHESTER R. GOFF
By Hill, Sherman, Meroni, Gross & Simpson
Attys

United States Patent Office 2,824,215
Patented Feb. 18, 1958

2,824,215
HEADLIGHT ADJUSTMENT
Chester R. Goff, Walnut Ridge, Ark.

Application July 24, 1956, Serial No. 599,794

3 Claims. (Cl. 240—41.6)

This invention relates to headlights and the like, as for automobiles, and more particularly relates to novel means providing adjustment of headlights to permit the user of the automobile to readily and conveniently adjust the direction of the light beam.

It has been recognized that variations in the loading of an automobile result in objectionable variations in the direction of the light beam emitted from the automobile headlight. Even a relatively small variation in the direction of the light beam, as may be caused by a heavy or rearward loading of a soft-sprung automobile, may cause the light beam to be projected in a direction which may produce excessive glare in the eyes of oncoming drivers. This of course is quite objectionable, and may be very dangerous.

Accordingly, it is an object of the present invention to provide novel means for adjusting the inclination of an automobile headlight beam relative to the frame of the automobile.

It is a corresponding object of the present invention to provide a new and improved headlight adjustment which is of relatively economical manufacture and assembly, which is positive yet convenient in operation, and which will provide a full range of light beam adjustibility to compensate for wide variations in vehicle loading.

These and other objects, features, and advantages of the present invention will be readily apparent from the following description of an illustrative embodiment thereof taken in conjunction with the accompanying somewhat diagrammatic drawings, in which:

Figure 1 is a front elevational view of an automotive headlight assembly embodying principles and concepts of the present invention, the lamp unit removed for clarity of presentation;

Figure 2 is a longitudinal, cross-sectional fragmental view thereof, taken generally along the line II—II of Fig. 1;

Figure 3 is a fragmentary, transverse cross-sectional view taken generally along the line III—III of Fig. 2.

A headlight assembly 10 embodying concepts and principles of the present invention is illustrated in the drawings. Such an assembly desirably includes a lamp unit 12 (Fig. 2), a lamp carrier 14, and a frame ring member 16. It will be understood that the frame ring 16 is mounted by suitable means (not shown) on the frame of the associated vehicle.

According to the present invention, novel means movably support the lamp carrier 14 from the frame ring 16 to provide for controlled adjustment of the relative inclination of the carrier, to thus provide control of the direction of the light beam emitted from the lamp unit 12, the adjustment being selectively operable by the user of the vehicle.

Accordingly, there is interposed between the lamp carrier 14 and the frame ring 16, an adjustable mounting 18, shown best in Figs. 2 and 3. In the form illustrated, the adjustable mounting 18 includes a control member such as a threaded control rod or shaft 20 threadedly engaging an associated member such as a threaded bushing or nut 22, the relative rotation of shaft 20 and nut 22 being effective to vary the spacing between the lamp carrier 14 and the frame ring 16, as will now be explained.

The nut 22 is shown as fixed to the frame ring 16 as by a mounting yoke or strap 24 which firmly engages the nut 22 and is secured as by screws 26 to the frame ring 16. It is thus seen that the nut 22 is fixed to the frame ring 16 against either rotary or axial movement.

The threaded control shaft 20, which is supportingly connected to the lamp carrier 14 for threaded co-operation with the nut 22, is provided with a longitudinally directed, forwardly presented, tapped opening 28. In this opening 28 is screwed an adjustable stem such as a screw 30. For relating the position of screw 30 with the lamp unit, the head 32 of the screw 30 bears against a radially extending flange 34 of an L-shaped clip 36 secured to the lamp carrier 14 as by a weld 40, the weld 40 extending between the carrier 14 and a flange 41 of clip 36 opposite flange 34.

Thus it will be seen that reaction of the threads of nut 22, in response to relative rotation of the threaded shaft 20 and the nut 22 will be effective to move the threaded shaft 20 and stem 30 in a direction fore-and-aft with respect to frame ring 16, and to act through the clip 36 to move the lamp carrier 14 with respect to the frame ring 16, and thus adjust the direction of the light beam of the lamp 12 carried in carrier 14.

For effecting the desired relative rotation of the control shaft 20 and nut 22, to effect the desired corresponding adjustment of the direction of the light beam, means as now will be described are provided. In the form illustrated, such means comprise a control arm 44 secured as by a screw 46 to the rearward end of the threaded control shaft 20. The end of arm 44 opposite its connection to the control shaft 20 is provided with an attachment means 48 adapted to receive an end 50 of a sheathed operating cable such as a Bowden wire 52 or the like.

The Bowden wire 52, as illustrated in Fig. 1, extends from the headlight assembly to a conveniently accessible position desirably within the interior of the passenger compartment of the vehicle, and as shown, extends to a convenient location on the automobile dash board 54. There the cable is provided with an operating handle or knob 56.

Desirably, means are provided for urging the arm 44 toward a direction corresponding to a compressive force or push applied to the Bowden wire 52. Such means in the embodiment illustrated comprises a torsion spring 60. One end 62 of the spring 60 is shown as engaging the frame ring 16, and the bight 64 of the spring is shown as convoluted around the shank of screw 46, with the other end 66 of spring 60 shown as formed to provide a finger 68 which engages arm 44 to bias the same as desired.

In addition to the adjustable mounting 18, other means are also provided to support and control the position of the lamp carrier 14. Such additional means include a tension spring 70 interconnecting the carrier 14 and frame ring 16 adjacent the adjustable mounting 18. Another tension spring 72, peripherally spaced from the spring 70, likewise interconnects the carrier 14 and the frame ring 16. Generally opposite the spring 72, an adjustable mount 74 is provided, including a screw 76 which adjustably interconnects a suitable lug or ear 78 provided on the carrier 14 with a corresponding lug or ear (not shown) fixed on the frame ring 16. The mount 74, together with the spring 72, thus provide means for adjusting the lateral direction of the light beam.

Fulcrum points are provided by the rearward offsets or depressions 82 which are pressed from the metal of the lamp carrier 14 rearwardly to provide fulcrums or supports which engage the frame ring 16.

Thus it is seen that to adjust the inclination of the headlight beam, of a headlamp unit embodying the present invention, the driver need only to manipulate the control knob 56. This effects linear travel of the Bowden wire 50, which is effective to rotate the crank arm 44 to impart a rotation to the control shaft 20. Rotation of control shaft 20 is reacted by the threaded engagement thereof with the fixed nut 22, to cause the control shaft to move axially. This axial movement, in turn, acts through the stem 30 and bracket 36 to move the lamp carrier 14 with respect to the frame ring 16, thereby effecting the desired adjustment of the direction of the light beam. The arrangement is economical, yet positive and effective in operation.

It will thus be apparent from the foregoing description, considered in conjunction with the accompanying drawings, that the present invention provides a new and improved headlight adjustment having the desired advantages and characteristics, and accomplishing its intended objects, including those hereinbefore pointed out and others which are inherent in the invention as described.

It will be understood that modifications and variations may be effected without departing from the scope of the novel concepts of the present invention.

I claim as my invention:

1. A device of the type described, including in combination, a lamp carrier member; a frame member; a nut fixedly carried by said frame member; a rotatable member threadedly engaging said nut and having an arm radially extending therefrom; an actuating cable means; means for pulling and pushing said cable means; said actuating cable means being operatively connected to said arm eccentrically of its axis of rotation whereby pushing and pulling of said cable means impart rocking motions of less than 180° to said rotatable member, which motions are reacted to by said nut to move said rotatable member axially; and means operatively interconnecting said rotatable member and said lamp carrier member.

2. A device of the type described, including in combination, a lamp carrier member; a frame member; a nut fixedly carried by said frame member; a rotatable member threadedly engaging said nut and having an arm radially extending therefrom; a sheathed actuating cable means; means for pulling and pushing said cable means; said actuating cable means being operatively connected to said arm eccentrically of its axis of rotation whereby pushing and pulling of said cable means impart rocking motions of less than 180° to said rotatable member which motions are reacted to by said nut to move said rotatable member axially; means operatively interconnecting said rotatable and said lamp carrier member; and spring means biasing said arm in one direction for aiding said cable, when pushed to rock said arm.

3. In a device of the type described, including a lamp carrier member; a frame member; first means carried by the frame member and coacting therewith for imparting forward and rearward reactive thrusts; and second means engaging said first means for forward and rearward relative displacement therebetween, said second means being operatively connected to said lamp carrier member for imparting tilting movements thereto, the improvement comprising in combination, an arm radially extending from one of said means and being jointly rotatable therewith; a sheathed actuating cable; means for pulling and pushing one end of said cable; the other end of said cable being operatively connected to said arm remotely from its axis of rotation whereby pulling and pushing of said cable impart rocking motions of less than 180° to said one means having the arm, which motions are reacted to by said means engaging therewith to thereby tilt the lamp carrier.

References Cited in the file of this patent

UNITED STATES PATENTS

| | | |
|---|---|---|
| 1,513,722 | Whitcomb | Oct. 28, 1924 |
| 1,520,551 | Raver | Dec. 23, 1924 |
| 1,575,413 | Collier | Mar. 2, 1926 |
| 2,605,388 | Theisen | July 29, 1952 |